United States Patent [19]

Gantois

[11] Patent Number: 5,497,967
[45] Date of Patent: Mar. 12, 1996

[54] BICYCLE REPAIR STAND

[76] Inventor: Johan Gantois, Polderstraat 22, 8670 Oostduinkerke-Koksijde, Belgium

[21] Appl. No.: 208,390

[22] Filed: Mar. 10, 1994

[30] Foreign Application Priority Data

Mar. 10, 1993 [BE] Belgium ................ 09300229

[51] Int. Cl.$^6$ ...................................... A47F 7/00
[52] U.S. Cl. ................ 248/166; 211/22; 248/176.3
[58] Field of Search ..................... 248/165, 166, 248/167, 176, 671, 676; 211/22, 17

[56] References Cited

U.S. PATENT DOCUMENTS

| | | | |
|---|---|---|---|
| 559,312 | 4/1896 | Seely | 248/176 |
| 564,733 | 7/1896 | Beardsley | 211/22 |
| 588,291 | 8/1897 | Porter | 211/22 |
| 588,376 | 8/1897 | Banker et al. | 211/17 |
| 592,544 | 10/1897 | Graham et al. | 211/22 |
| 640,631 | 1/1900 | Conti | 211/22 |
| 4,846,353 | 7/1989 | Knight et al. | 211/22 |
| 5,320,227 | 6/1994 | Minoura | 248/166 |

FOREIGN PATENT DOCUMENTS

| | | |
|---|---|---|
| 1201707 | 1/1960 | France . |
| 2409173 | 6/1979 | France . |
| 2466226 | 4/1981 | France . |
| 2560835 | 9/1985 | France . |
| 2905788 | 8/1980 | Germany . |
| 9015322 | 3/1991 | Germany . |
| 22037 | of 1893 | United Kingdom ............ 211/22 |
| 446974 | 5/1936 | United Kingdom ............ 211/22 |

OTHER PUBLICATIONS

Japanese Unexamined Utility Model Publication 2–78483 Dec. 1988.
Le Cycle, Nov. 1965, p. 15.

*Primary Examiner*—Karen J. Chotkowski

[57] ABSTRACT

A bicycle repair stand, includes a fixed erectable first support part (2) with a first holder (3) which allows a bicycle (4) to be supported by its crank axle holder (5) or in the immediate vicinity of the crank axle holder (5) and hingeably connected to the first support part (2), a second support part (6) with a second holder (7) which allows the above mentioned bicycle (4) to be supported on the fork (8), whereby the angle of the second support part (6) is adjustable.

17 Claims, 3 Drawing Sheets

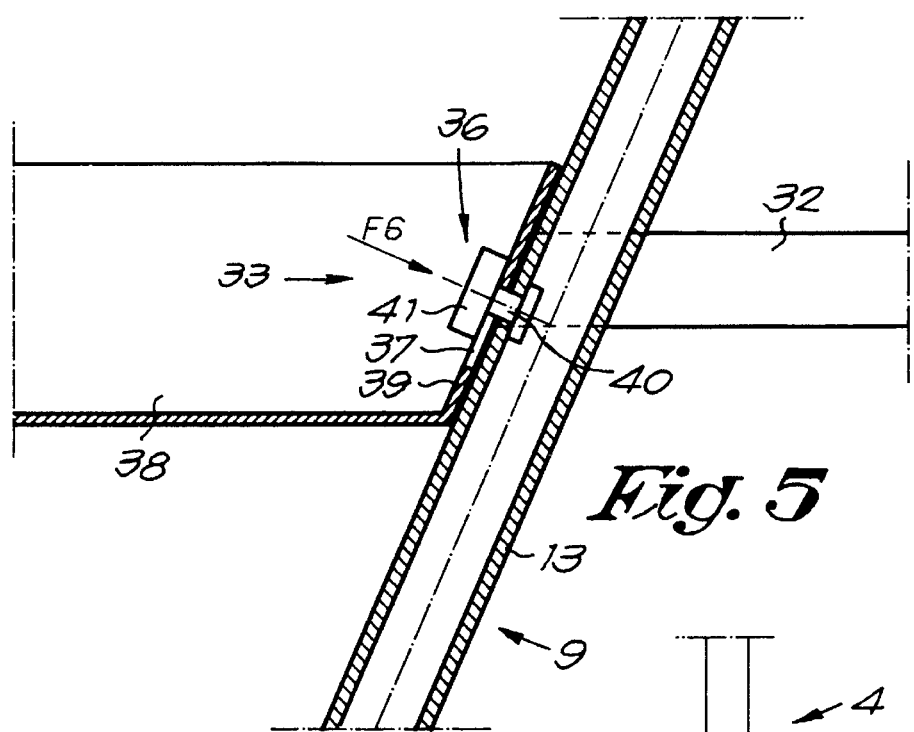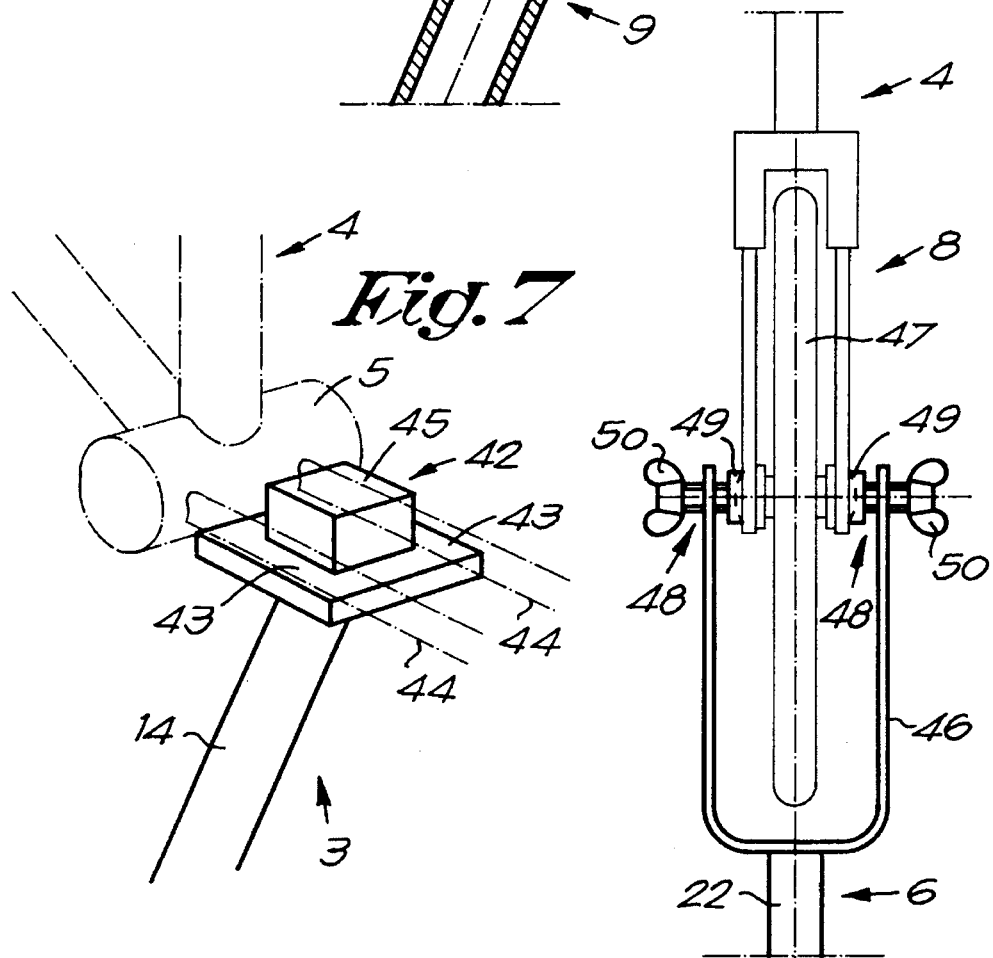

BICYCLE REPAIR STAND

BACKGROUND OF THE INVENTION

This invention relates to a bicycle repair stand, in other words a device which allows a bicycle to be repaired while this is securely anchored in a well-defined position.

Everywhere it is known that with the repair or the maintenance of a bicycle, an upright positioning of the cycle is recommended and that when the above mentioned bicycle is stably positioned at some height from the ground, work on the bicycle can be performed most ergonomically, or in other words all parts are most easily accessible to the person.

Bicycle repair stands are already known in various forms. The known embodiments however show various disadvantages, either because of the fact that they are not very stable, are not, universal, are awkward in use or take up much room.

SUMMARY OF THE INVENTION

The object of the present invention is therefore a bicycle repair stand which does not show the above mentioned disadvantages.

In the first place the invention aims at a bicycle repair stand which is universal, in other words a bicycle repair stand which can be used for various types of bicycles, such as mountain bikes, minibikes, racing bicycles, etc. irrespective of the form of the frame.

Another object of the invention consists in offering a simple and stable construction which is very easy and quick to erect, whereby the weight of this construction is small and whereby this construction can be manufactured at low cost price.

Another object of the invention consists in offering a bicycle repair stand which can be folded up and which is very compact in folded up position and can consequently easily be stored and can be transported without problems.

For this purpose the invention relates to a bicycle repair stand, characterized in that it principally consists of a fixed erectable first support part with a first holder which allows a bicycle to be supported by its crank axle holder or in the immediate vicinity of the crank axle holder and hingeably connected to the first support part, a second support part with a second holder which allows-the above mentioned bicycle to be supported near the free extremity of a fork, whereby the angle of the second support part is adjustable.

Because of the fact that the second holder is attached to a hingeable support part, the distance between the first holder and the second holder can easily be adjusted to the dimensions of every bicycle, irrespective of the distance between the crank axle holder and the fork in question.

The second support part is preferably attached underneath the first support part. Because of this it is achieved that, by the rotation of the second support part, in order to alter the distance between the above mentioned two holders, the position of the second holder hardly changes in height.

BRIEF DESCRIPTION OF THE DRAWING

In order to show better the characteristics according to the present invention, some preferred embodiments are described hereafter, as examples without any restrictive character, with reference to the attached drawings, in which:

FIG. 5 shows a cross section according to line V—V in FIG. 1;

FIG. 7 shows a variant of the part that is represented in FIG. 3;

FIG. 8 shows another part of a bicycle repair stand according to the invention.

DETAILED DESCRIPTION OF THE PREFERRED EMBODIMENTS

Figure 1:
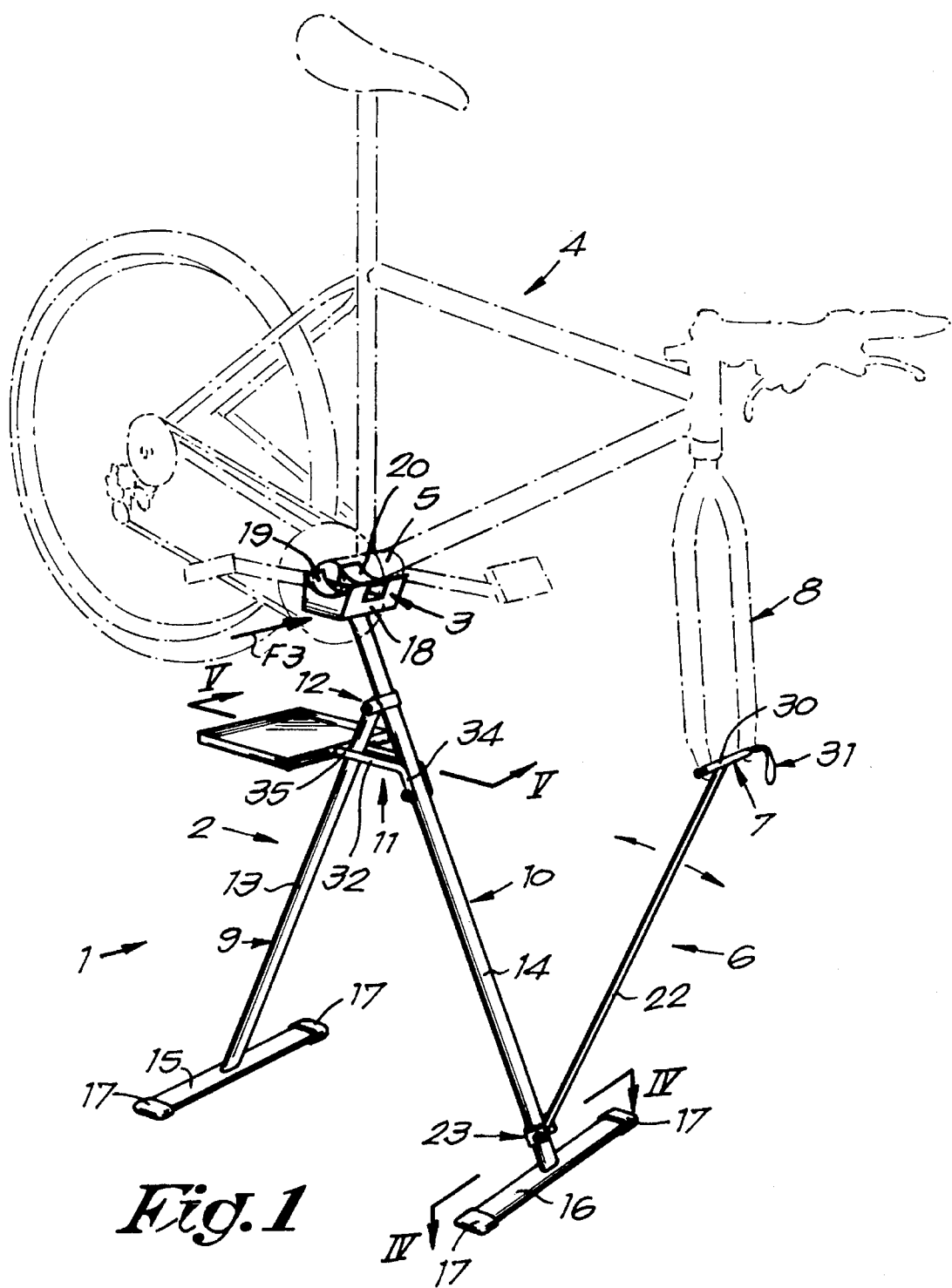
FIG. 1 shows the bicycle repair stand in erected position.
Figure 2:
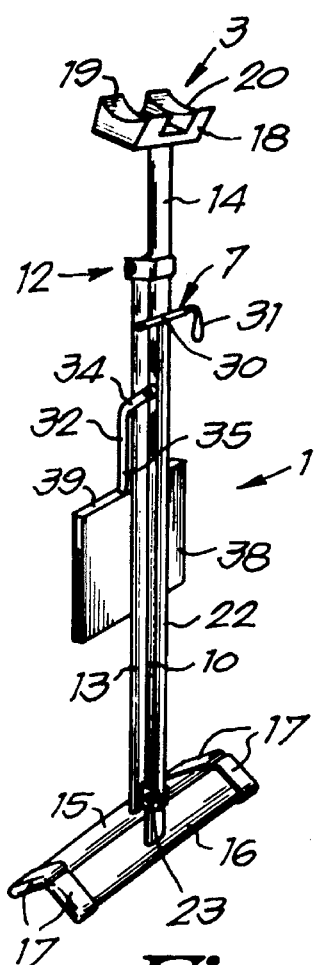
FIG. 2 shows the bicycle repair stand from FIG. 1 in folded up position.

As shown in FIGS. 1 and 2 the invention relates to a bicycle repair stand 1. According to the invention this bicycle repair stand 1 principally consists of a fixed erectable First support part 2 with a first holder 3 which allows a bicycle 4 to be supported by its crank axle holder 5 or in the immediate vicinity of the crank axle holder 5, and hingeably connected to the first support part 2, a second support part 6 with a second holder 7 which allows the above mentioned bicycle 4 to be supported by the free extremity of a fork 8, preferably the front fork.

The first support part 2 preferably consists of at least two support elements 9 and 10 hingeably connected to each other, which allow the bicycle repair stand 1 to be folded open, respectively to be completely folded up, whereby this first support part 2 is further provided with a lock 11 in order to lock the above mentioned support elements 9 and 10 in folded open position.

In the most preferred embodiment, which is represented in FIGS. 1 and 2, the support part 2 consists precisely of two support elements 9 and 10, which are coupled to each other by means of a hinge 12. The hinge 12 is hereby on the extremity of one of the two support elements, preferably the support element 9, and provides the connection to the second support element, in this case the support element 10, at a place which is located at a relatively small distance from the upper extremity of the support element 10.

The support elements 9 and 10 are preferably T-shaped. More especially they each consist of a tubular profile, respectively 13 and 14, and a transverse foot mounted hereunder, respectively 15 and 16. Both the profile 13 and 14 and the feet 15 and 16 can be manufactured out of tubular profiles. The feet 15 and 16 are preferably provided with protective pieces 17, for example protective caps out of plastic, which prevent the slipping of the bicycle repair stand 1 and the damaging of the feet 15 and 16, as well as of the surface below.

Figure 3:
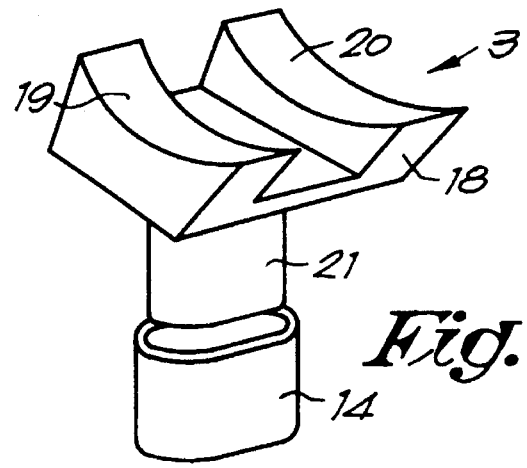
FIG. 3 shows a view on a larger scale and in dismantled position of the part that is indicated by arrow F3 in FIG. 1.

As shown in FIG. 3 the first holder 3 preferably consists of an element 18 which is provided with one or more seat forming notches. In the example shown the holder 3 is provided with two seats located at a distance from each other and in line, formed by semicircular notches 19 and 20, whereby for this purpose use is made of a U-shaped element 18. Because of the fact that the seats are at a distance from each other, a space comes into being which allows a free passage for cables which possibly pass under the crank axle holder 5.

As is again shown in FIG. 3 the first holder 3 preferably consists of a one-piece element 18 out of plastic or similar. In order to allow a simple attachment between the holder 3 and the second support element 10, the element 18 is provided on its underside with a protrusion 21 which can be pushed into the upper extremity of the above mentioned profile 14.

The above mentioned second support part 6 preferably consists, as shown in FIG. 1, of one support element, hereinafter called the third support element 22. This third support element 22 is attached near its lower extremity to the first support part 2 by means of a hinge 23. The hinge 23 is preferably in the lower half of the support part 2, and more especially still near the lower extremity of the second support element 10.

Figure 4:
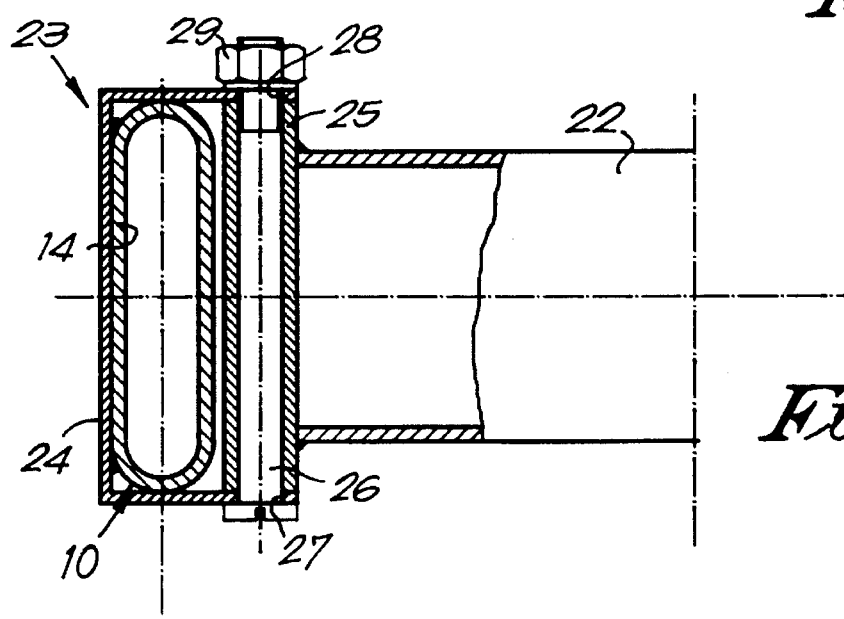
FIG. 4 shows a cross-section according to line IV—IV in FIG. 1.

As shown in FIG. 4 the hinge 23 preferably consists of a U-shaped bracket 24 which is attached around the profile 14, for example by means of a welded joint, a bushing 25 which is attached perpendicular to the lower extremity of the third support element 22; and a pivot 26 which passes through openings 27 and 28 in the extremities of the bracket 24 and through the bushing 25. Such construction allows an easy assembly.

The hinge point between the first support part 2 and the second support part 6 preferably consists of a clamping universal joint, such that the second support part 6 remains in the last adjusted position. In case use is made of a hinge 23 as represented in FIG. 4, the pivot 26 for this purpose preferably consists of a bolt with a nut 29, such that through the tightening hereof the desired clamping force is achieved.

The above mentioned hinge 12 can be produced analogous to the hinge 23 shown in FIG. 4.

The hinge points and the support elements 9, 10 and 22 are preferably so conceived that the support elements 9, 10 and 22 come to lie parallel next to each other in folded up position.

As shown in FIG. 1, the above mentioned second holder 7 preferably consists of a-transverse shaft 30 mounted on the upper extremity of the second support part 6, over which the fork 8 can be installed, and a tightening mechanism 31 in order to clamp the bicycle in by its fork 8. The tightening mechanism 31 can consist of a quick coupling.

Figure 6:
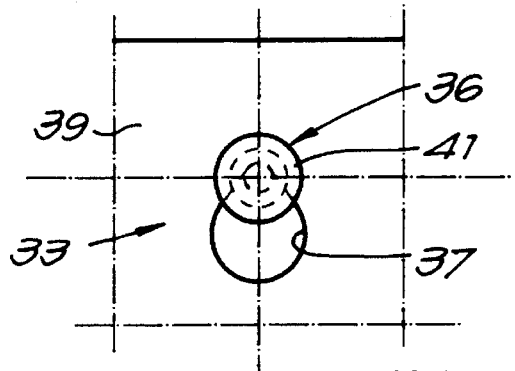
FIG. 6 shows a view according to arrow F6 in FIG. 5.

The above mentioned lock 11 preferably consists of a connecting element 32 which is hingingly attached to one of the support elements 9 and 10, in this case the support element 10, and coupling means 33, which are represented in FIGS. 5 and 6, in order to couple the free extremity of the connecting element 32 to the other support element, in this case the support element 9.

The connecting element 32 preferably provides an L-shaped, curved or bent connection which is hingingly secured by one extremity 34 to the support element 10, and by its other extremity 35 fits around the first support element 9. In the example shown for this purpose use is made of two arms on both sides of the support elements 9 and 10.

The above mentioned coupling means 33 can consist of a hook-shaped element 36 which is fixedly secured to support element 9 but which can extend through an opening 37 as will be more fully discussed below.

As shown in FIGS. 1 and 2, the bicycle repair stand 1 is preferably provided with a tool table 38 which is attached to the connecting element 32 or produced in one piece herewith. Because of the fact that the hingeable connecting element 32 is L-shaped, when folding up the bicycle repair stand 1 the tool table 38 can be brought parallel to the support elements 9, 10 and 22, through which this does not form an inconvenient protrusion in folded up form.

As shown in FIGS. 5 and 6, the above mentioned opening 37 fitted in a turned up edge 39 of the tool table 38 which forms part of connecting element 32. The hook-shaped element 36 can hereby consist of a pin 40 with a widened head 41 which is fixedly attached in the above mentioned profile 13, whereby the head 41 passes freely through the opening 37. The coupling means 33 can possibly still be provided with an additional lock, not shown in the figures, such that the coupling cannot come loose through vibrations.

The use of the bicycle repair stand 1 can easily be deduced from FIGS. 1 to 6 on the basis of the above description.

When erecting the support elements 9 and 10 are folded out from each other and the connecting element 32 is securely hooked behind the hook-shaped element 36 by means of the opening 37 in the turned up edge 39. The third support element 22 is tilted slightly forward. Through the clamping action in the hinge 23 this remains in the adjusted position. Subsequently, after removal of the front wheel, the bicycle 4 is placed with the crank axle holder 5 on the first holder 3 of the bicycle repair stand 1. Because of the fact that the center of gravity of the bicycle 4 is situated principally above the first holder 3, and because of the fact that the first holder 3 is securely erected, it requires little effort subsequently to take hold of the bicycle 4 by the fork 8 and, by still adjusting the support element 22 a little, to place and to clamp in the fork 8 in the second holder 7.

Folding up the bicycle repair stand 1 occurs simply by loosening the lock 11 and folding the support elements 9, 10 and 22 against each other. Because of the fact that the connecting element 32 is curved, the tool table 38 can be folded clown to a position parallel to the support elements 9, 10 and 22.

In FIG. 7 a variant of the first holder is shown, which allows a bicycle 4 to be supported immediately behind the crank axle holder 5. The holder consists in this case of an element 42 which is provided with two seats 43 extending parallel and located at a distance from each other which can support the tubular parts 44 in question of the bicycle 4. The element 42 can as shown for this purpose consist of a flat base with a protrusion 45 placed centrally thereon.

In FIG. 8 another variant of the second holder 7 is shown, which consists of a fork-shaped element 46 between which a bicycle 4 can be clamped while the wheel 47 in question is still present therein, so that the wheel does not have to be dismounted. The wheel can hereby on its axle extremities be clamped in between the clamping elements 48, formed out of clamping pads 49 anti-tightening means 50.

The present invention is in no way restricted to the embodiments described above and shown in the figures, but such bicycle repair stand can be developed in various forms and dimensions without departing from the scope of the invention.

I claim:

1. A bicycle repair stand comprising:

a first support part erectable from a storage position to a stable support position, said first support part having upper and lower ends and carrying a first holder at the upper end thereof that is adapted to support a bicycle at a crank axle portion thereof, said first support part including first and second support elements each of which includes a foot support member adapted to engage a support surface, said first support element being connected at a hinged connection to said second support element whereby said first and second support elements can be folded together wherein said first support part assumes said storage position and unfolded wherein said first support part assumes said support position; and a second support part having first and second end portions, the first end portion of said second support part being hingedly connected to the lower end of said first support part so as to be spaced below the hinged connection between the first and second support elements and below said first holder, the second end portion of said second support part carrying a second holder adapted to support a fork portion of a bicycle.

2. The bicycle repair stand according to claim 1, wherein said first support element is hingedly connected to an upper portion of said second support element; said first holder is mounted to the upper portion of said second Support element; and said second support part is hingedly connected to the second support element of said first support part.

3. The bicycle repair stand according to claim 1, wherein each of said first and second support elements has a generally T-shaped profile that is partially defined by a respective said foot support member.

4. The bicycle repair stand according to claim 3, wherein the first end portion of said second support part is hingeally connected to said first support part adjacent to one of said foot support members.

5. The bicycle repair stand according to claim 1, wherein said first holder is formed with a notched seat adapted to receive a crank axle portion of a bicycle.

6. The bicycle repair stand according to claim 5, wherein said first holder is formed with two, transversely spaced notched seats.

7. The bicycle repair stand according to claim 1, wherein said first holder comprises a plate element provided with a pair of spaced, substantially parallel seats that are adapted to support respective tubular frame members located at a crank axle portion of a bicycle.

8. The bicycle repair stand according to claim 1, wherein said first holder comprises a unitary plastic part having an underside provided with a protrusion attached to said first support part.

9. The bicycle repair stand according to claim 1, wherein said second support part consists of a single support element, said first and second support parts being positioned substantially parallel to each other when the bicycle repair stand is in said storage position.

10. The bicycle repair stand according to claim 1, wherein said second holder comprises a fork-shaped element including a pair of clamping elements adapted to be secured to a front wheel of a bicycle.

11. The bicycle repair stand according to claim 1, wherein the first end portion of the second support part is hingedly connected to said first support part through clamping means permitting said second support part to be fixed in a desired upright position.

12. The bicycle repair stand according to claim 1, wherein said second holder comprises a transversely extending shaft having first and second end portions which are adapted to receive a fork of a bicycle, said second holder further including a tightening mechanism adapted to clamp a bicycle fork.

13. The bicycle repair stand according to claim 12, wherein said tightening mechanism comprises a quick-release coupling.

14. A bicycle repair stand comprising:

a first support part erectable from a storage position to a stable support position, said first support part carrying a first holder that is adapted to support a bicycle at a crank axle portion thereof, said first support part including first and second support elements, said first support element being connected at a hinged connection to said second support element whereby said first and second support elements can be folded together wherein said first support part assumes said storage position and unfolded wherein said first support part assumes said support position;

a second support part having first and second end portions, the first end portion of said second support part being hingedly connected to said first support part at a location spaced from the hinged connection between the first and second support elements and below said first holder, the second end portion of said second support part carrying a second holder adapted to support a fork portion of a bicycle; and means for locking said first support part in said support position, said locking means including a connecting element that is hingedly attached at one end thereof to one of said first and second support elements and means for releasably coupling another end of said connecting element to the other of said first and second support elements.

15. The bicycle repair stand according to claim 14, wherein said coupling means comprises a hook-shaped element carded by said other of said first and second support elements and an opening formed in said one end of said connecting element, said opening being adapted to receive said hook-shaped element.

16. The bicycle repair stand according to claim 14, wherein said connecting element is hingedly attached to one of said first and second support elements and extends around the other of said first and second support elements.

17. The bicycle repair stand according to claim 16, wherein said connecting element comprises a table member, said table member being positioned substantially horizontal when said bicycle repair stand is in said support position and being substantially parallel to said first and second support elements when said bicycle repair stand is in said storage position.

* * * * *